United States Patent Office 3,480,637
Patented Nov. 25, 1969

3,480,637
3,3-BIS(CARBO-LOWER-ALKOXY)INDOLO[2,3-a] QUINOLIZINIUM SALTS
Bryce Douglas, Phoenixville, Pa., and Jerry A. Weisbach, Cherry Hill, N.J., assignors to Smith Kline & French Laboratories, Philadelphia, Pa., a corporation of Pennsylvania
No Drawing. Filed Apr. 18, 1967, Ser. No. 631,609
Int. Cl. C07d 39/12
U.S. Cl. 260—294.3    7 Claims

ABSTRACT OF THE DISCLOSURE

Indolo[2,3-a]quinolizinium salts having two carbo-lower alkoxy substituents in the 3-position, which are prepared by reacting a 3-(2-aminoethyl)indole, formaldehyde and a tetraester and dehydrating the resulting lactam, have analgesic activity. 3,3 - bis(carbo-lower alkoxy)indolo[2,3 - a]quinolizines are useful as intermediates for preparing the quinolizinium salts.

---

This invention relates to new 3,3-bis(carbo-lower alkoxy)indolo[2,3-a]quinolizinium salts having pharmacodynamic activity, in particular, having analgesic activity. In addition, this invention relates to new 3,3-bis (carbo-lower alkoxy)indolo[2,3-a]quinolizines which are useful as intermediates for preparing quinolizinium salts of this invention.

The 3,3 - bis(carbo - lower alkoxy)indolo[2,3-a]quinolizinium salts of this invention are represented by the following formula:

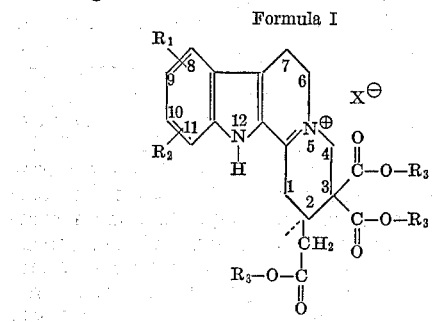

in which:

$R_1$ and $R_2$ are hydrogen, lower alkyl or lower alkoxy or, when taken together, methylenedioxy;
$R_3$ is methyl or ethyl; and
X is a pharmaceutically acceptable anion.

Preferred compounds of Formula I are those in which $R_1$ and $R_2$ are hydrogen or methoxy and $R_3$ is methyl, X is preferably perchlorate, chloride, sulfate or nitrate.

The 3,3 - bis(carbo - lower alkoxy)indolo[2,3-a]quinolizines of this invention are represented by the following formula:

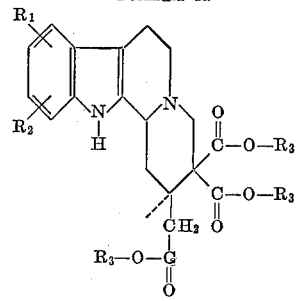

in which:

$R_1$ and $R_2$ are hydrogen, lower alkyl or lower alkoxy or, when taken together, methylenedioxy; and
$R_3$ is methyl or ethyl.

The terms "lower alkyl" and "lower alkoxy" where used herein denote groups having 1 to 4 carbon atoms.

The 3,3 - bis(carbo - lower alkoxy)indolo[2,3-a]quinolizinium salts of this invention are prepared by the following procedure:

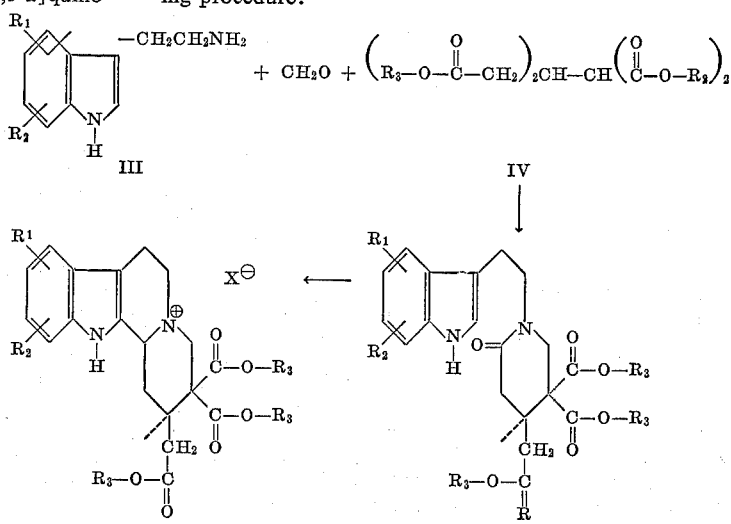

The terms $R_1$, $R_2$, $R_3$ and X are as defined above.

According to the above procedure, a 3-(2-aminoethyl) indole (III), formaldehyde and a tetraester (IV) in a lower alkanol such as t-butanol are condensed to give a lactam (V). The lactam is treated with a dehydrating agent such as phosphorus oxychloride, phosphorus pentoxide, phosphorus pentachloride or polyphosphoric acid to give the indolo-quinolizinium phosphate salt. Advantageously, the phosphate salts are hydrogenated in the presence of a catalyst such as platinum oxide in a solvent, for example a lower alkanol, to reduce the double bond at the 5,12b-position to give the indolo[2,3-a]quinolizine intermediates of Formula II and the quinolizines are oxidized with mercuric acetate in dilute acetic acid and treated with an alkali metal perchlorate to give the quinolizinium perchlorate salts of this invention. Alternatively, other salts are prepared from the phosphate salts by known methods for example by double decomposition with an appropriate salt. Salts may be converted to other salts by dissolving them in an appropriate solvent such as a lower alkanol, for example methanol, and passing the solution through an ion exchange resin.

The compounds of this invention represented by Formula I above may be administered orally or parenterally in conventional dosage forms, such as tablets, capsules, injectables or the like, by incorporating an appropriate dose of the compound with pharmaceutical carriers according to accepted pharmaceutical practices.

The following examples are not limiting but are illustrative of this invention.

EXAMPLE 1

To 0.655 g. of sodium covered with 50 ml. of benzene under nitrogen is added 0.2 ml. of methanol and the mixture is heated to reflux. Dimethyl malonate (4.15 g.) is added and the refluxing is continued for three hours. An additional 3 ml. of dimethyl malonate and 2.5 ml. methanol are added and the refluxing is continued an additional 20 hours. Five grams of dimethyl 3-chloroglutarate in 20 ml. benzene is added and the reaction is refluxed for three days. Acetic acid, water and ether are added. The ether-benzene solution is washed with 5% aqueous sodium bicarbonate solution and saturated aqueous sodium chloride solution and then dried over sodium sulfate and distilled in vacuo to give trimethyl 2-carbomethoxymethylpropane-1,1,3-tricarboxylate.

A mixture of 42 g. of the above prepared propanetricarboxylate compound, 25 g. of 3-(2-aminoethyl)indole, 4 ml. of N,N-dimethylaniline and 12.2 ml. of aqueous 37% formaldehyde solution in 700 ml. of t-butyl alcohol is stirred under nitrogen for eight days, then refluxed for one hour. The t-butyl alcohol is removed in vacuo and the residue is dissolved in chloroform and extracted with 5% sulfuric acid. The chloroform solution is washed with saturated sodium chloride solution and then dried over sodium sulfate. The chloroform is removed in vacuo. The residue is taken up in benzene and chromatographed on a "Florisil" column, using as eluent benzene, then chloroform and finally 5% methanol–95% chloroform. The 5% methanol–95% chloroform solvent mixture contains 5,5-bis(carbomethoxy)-4-carbomethyl-1-[β-(3-indoyl)ethyl]-2-piperidone which is isolated by removing the solvent mixture in vacuo.

Eight grams of the above prepared piperidone, 400 ml. of benzene and 50 ml. of phosphorus oxychloride are refluxed under nitrogen for 2.5 hours. The mixture is cooled and petroleum ether is added. The solvents are decanted off and the residue is washed with petroleum ether to give 3,3-bis(carbomethoxy)-2-carbomethoxymethyl-1,2,3,4,6,7-hexahydro - 12H - indolo[2,3-a]quinolizinium dichlorophosphate.

Five grams of 3,3-bis(carbomethoxy)-2-carbomethoxymethyl - 1,2,3,4,6,7 - hexahydro-12H-indolo[2,3-a]quinolizinium dichlorophosphate, prepared as described above, in 100 ml. of methanol containing 0.75 g. of platinum oxide is hydrogenated in a shaker apparatus for about 5.5 hours. The mixture is filtered and concentrated and the residue is treated with chloroform-dilute ammonia. The chloroform layer is washed with saturated sodium chloride, dried over sodium sulfate, then chromatographed on "Florisil" using chloroform as the eluent to give 3,3-bis(carbomethoxy)-2-carbomethoxymethyl-1,2,3,4,6,7,12,12b-octahydroindolo[2,3-a]quinolizine.

One gram of 3,3-bis(carbomethoxy)-2-carbomethoxymethyl - 1,2,3,4,6,7,12,12b - octahydroindolo[2,3-a]quinolizine is added to a mixture of 3.0 g. of mercuric acetate and 100 ml. of 5% acetic acid. The resulting mixture is heated under nitrogen on a steam bath for three hours. The mixture is filtered and 10 g. of sodium perchlorate in water is added to the filtrate. The precipitate is filtered off and recrystallized from methanol-ethyl acetate to give 3,3-bis(carbomethoxy) - 2 - carbomethoxymethyl-1,2,3,4,6,7-hexahydro - 12H - indolo[2,3-a]quinolizinium perchlorate.

Similarly, using triethyl 2-carbethoxymethylpropane-1,1,3-tricarboxylate in place of trimethyl 2-carbomethoxymethylpropane-1,1,3-tricarboxylate in the above procedure, the product is 3,3-bis(carbethoxy)-2-carbethoxymethyl-1,2,3,4,6,7-hexahydro - 12H - indolo[2,3-a]quinolizinium perchlorate.

Two grams of 3,3-bis(carbomethoxy)-2-carbomethoxymethyl - 1,2,3,4,6,7 - hexahydro - 12H - indolo[2,3-a]quinolizinum perchlorate in 100 ml. of methanol is treated with a methanol solution of potassium chloride. The mixture is concentrated and filtered. The filtrate is treated with ethyl acetate and filtered to give 3,3-bis(carbethoxy)-2-carbethoxymethyl - 1,2,3,4,6,7 - hexahydro-12H-indolo[2,3-a]quinolizinium chloride.

3,3 - bis(carbomethoxy)-2-carbomethoxymethyl - 1,2,3, 4,6,7-hexahydro - 12H - indolo[2,3-a]quinolizinium perchlorate is dissolved in methanol and the resulting solution is passed through a nitrate ion exchange resin to give the 3,3 - bis(carbomethoxy) - 2 - carbomethoxymethyl-1,2,3,4,6,7-hexahydro - 12H - indolo[2,3-a]quinolizinium nitrate.

EXAMPLE 2

A mixture of 42 g. of trimethyl 2-carbomethoxymethylpropane-1,1,3-tricarboxylate (prepared as in Example 1), 29.5 g. of 3-(2-aminoethyl)-5-methoxyindole and 15 ml. of aqueous 37% formaldehyde solution in 700 ml. of t-butyl alcohol is stirred for 48 hours, then refluxed for 90 minutes. The t-butyl alcohol is removed in vacuo and the residue is taken up in chloroform. The chloroform solution is washed successively with water, 5% hydrochloric acid and saturated sodium chloride solution and then dried over sodium sulfate. The chloroform is removed in vacuo. The residue is taken up in benzene and chromatographed on a "Florisil" column using as eluent benzene, then chloroform and finally 5% methanol–95% chloroform. The 5% methanol–95% chloroform solution contains 5,5-bis(carbomethoxy-4-carbomethoxymethyl - 1 - [β-(5-methoxy - 3 - indolyl) ethyl]-2-piperidone which is isolated by removing the solvent mixture in vacuo.

A mixture of 8.5 g. of the above prepared piperidone, 300 ml. of benzene and 30 ml. of phosphorus oxychloride is refluxed under nitrogen for four hours. The mixture is cooled and filtered to give 3,3-bis(carbomethoxy)-2-carbomethoxymethyl - 1,2,3,4,6,7 - hexahydro-9-methoxy-12H-indolo-[2,3-a]quinolizinium dichlorophosphate. This dichloro phosphate salt is dissolved in methanol and the resulting solution is treated with a saturated aqueous solution of sodium perchlorate to give, after filtering and recrystallizing from methanol-ethyl acetate, 3,3-bis(carbomethoxy) - 2 - carbomethoxy - 1,2,3,4,6,7 - hexahydro-9-methoxy-12H-indolo[2,3-a]quinolizinium perchlorate.

Similarly, using triethyl 2-carbethoxymethylpropane-1,1,3-tricarboxylate in place of trimethyl 2-carbomethoxymethylpropane-1,1,3-tricarboxylate in the above procedure, the product is 3,3-bis(carbethoxy)-2-carbethoxymethyl-1,2,3,4,6,7 - hexahydro - 9 - methoxy-12H-indolo [2,3-a]quinolizinium perchlorate.

A sample of 3,3-bis(carbomethoxy)-2-carbomethoxymethyl - 1,2,3,4,6,7 - hexahydro - 9-methoxy-12H-indolo [2,3-a]quinolizinium perchlorate in methanol is passed through a sulfate ion exchange resin to give 3,3-bis(carbomethoxy) - 2 - carbomethoxymethyl-1,2,3,4,6,7-hexahydro-9-methoxy-12H-indolo[2,3-a]quinolizinium sulfate.

EXAMPLE 3

By the procedure of Example 1 using the following in place of 3-(2-aminoethyl)indole:

3-(2-aminoethyl)-6-methoxyindole
3-(2-aminoethyl)-6-isopropoxyindole
3-(2-aminoethyl)-7-butoxyindole
3-(2-aminoethyl)-5,6-dimethoxyindole the following products are obtained, respectively:

3,3-bis(carbomethoxy)-2-carbomethoxymethyl-1,2,3,4,
6,7-hexahydro-10-methoxy-12H-indolo[2,3-a]quinolizinium perchlorate 3,3-bis(carbomethoxy)-2-carbomethoxymethyl-1,2,3,4,
6,7-hexahydro-10-isopropoxy - 12H - indolo[2,3-a]quinolizinium perchlorate 11-butoxy-3,3-bis(carbomethoxy)-2-carbomethoxymethyl-1,2,3,4,6,7-hexahydro-12H-indolo[2,3-a]quinolizinium perchlorate 3,3-bis(carbomethoxy)-2-carbomethoxymethyl-1,2,3,4,6-7-hexahydro-9,10-dimethoxy-12H-indolo[2,3-a]quinolizinium perchlorate.

EXAMPLE 4

Using the following indoles in place of 3-(2-aminoethyl)indole in the procedure of Example 1:

3-(2-aminoethyl)-5-methylindole
3-(2-aminoethyl)-6-methylindole the following products are obtained, respectively:

3,3-bis(carbomethoxy)-2-carbomethoxymethyl-1,2,3,4,6,
7-hexahydro-9-methyl-12H-indolo[2,3-a]quinolizinium perchlorate 3,3-bis(carbomethoxy)-2-carbomethoxymethyl-1,2,3,4,6,
7-hexahydro-10-methyl-12H-indolo[2,3-a]
quinolizinium perchlorate.

EXAMPLE 5

To 20 g. of 5,6-methylenedioxyindole dissolved in 400 ml. of anhydrous ether is added, gradually at 0° C. 20 ml. of oxalyl chloride. After 30 minutes at 0° C., the solid material is collected and washed with ether to give 5,6-methylenedioxyindole-3-glyoxylic acid chloride which is added portionwise to a stirred solution of 500 ml. of concentrated aqueous ammonia. After the addition is complete, stirring is continued for 30 minutes at 40–50° C. The mixture is cooled and filtered to give 5,6-methylenedioxyindole-3-glyoxylamide.

Two grams of 5,6-methylenedioxyindole-3-glyoxylamide is extracted with refluxing tetrahydrofuran into a solution of 2 g. of lithium aluminum hydride in 100 ml. of tetrahydrofuran. The reaction mixture is refluxed under nitrogen for 20 hours. Wet tetrahydrofuran and then water are added. The mixture is filtered and the solid material is washed with methylene chloride. The filtrate is extracted with four portions of 10% acetic acid. The acetic acid extracts are refluxed under nitrogen and filtered. The filtrate is neutralized with aqueous sodium hydroxide and then extracted with methylene chloride. The methylene chloride extracts are washed with saturated sodium chloride, dried over sodium sulfate and the solvent is removed in vacuo to give 3-(β-aminoethyl)-5,6-methylenedioxyindole.

By the procedure of Example 1, using 3-(β-aminoethyl)-5,6-methylenedioxyindole in place of 3-(β-aminoethyl)indole, the product is 3,3-bis(carbomethoxy)-2-carbomethoxymethyl - 1,2,3,4,6,7-hexahydro-9,10-methylenedioxy-12H-indolo[2,3-a]quinolizinium perchlorate.

By the same procedure using 5,6-dimethylindole in place of 5,6-methylenedioxyindole, the product is 3,3-bis-(carbomethoxy)-2-carbomethoxymethyl - 1,2,3,4,6,7-hexahydro - 9,10 - dimethyl-12H-indolo[2,3-a]quinolizinium perchlorate.

EXAMPLE 6

By the procedure of Example 5 using 5,6-dibutoxyindole (which is prepared from 3,4-dibutoxybenzaldehyde by condensation with nitromethane in the presence of a base, nitration with nitric acid and reduction in an acid medium), the product is 9,10-dibutoxy-3,3-bis(carbomethoxy)-2-carbomethoxymethyl - 1,2,3,4,6,7-hexahydro-12H-indolo[2,3-a]quinolizinium perchlorate.

EXAMPLE 7

Using 3-(2-aminoethyl)-5-butylindole (prepared by treating p-butylaniline with hydrochloric acid, then sodium nitrate, reducing the resulting diazonium chloride with stannous chloride and reacting the resulting p-butylphenyl-hydrazine with the diethyl acetal of 4-aminobutyraldehyde in the presence of a strong acid catalyst under conditions of the Fischer indole synthesis) in place of 3-(2-aminoethyl)-indole in the procedure of Example 1, the product is 9-butyl-3,3-bis(carbomethoxy)-2-carbomethoxymethyloxymethyl-1,2,3,4,6,7-hexahydro - 12H - indolo[2,3-a]quinolizinium perchlorate.

Similarly, using 2,4-diethylaniline the product is 3,3-bis(carbomethoxy - 2 - carbomethoxymethyl-9,11-diethyl-1,2,3,4,6,7-hexahydro - 12H - indolo[2,3-a]quinolizinium perchlorate.

What is claimed is:

1. A compound of the formula:

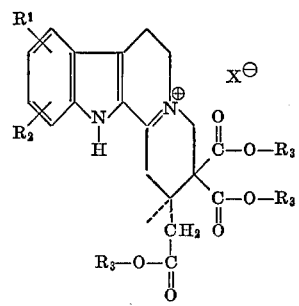

in which:

$R_1$ and $R_2$ are hydrogen, lower alkyl or lower alkoxy or, when taken together, methylenedioxy;

$R_3$ is methyl or ethyl and

X is a pharmaceutically acceptable anion.

2. A compound according to claim 1 in which $R_1$ and $R_2$ are hydrogen, $R_3$ is methyl and X is perchlorate.

3. A compound according to claim 1 in which $R_1$ and $R_2$ are hydrogen, $R_3$ is methyl and X is chloride.

4. A compound according to claim 1 in which $R_1$ is methoxy, $R_2$ is hydrogen, $R_2$ is methyl and X is perchlorate.

5. A compound according to claim 1 in which $R_1$ is methoxy in the 9-position, $R_2$ is hydrogen, $R_3$ is methyl and X is perchlorate.

6. A compound of the formula:

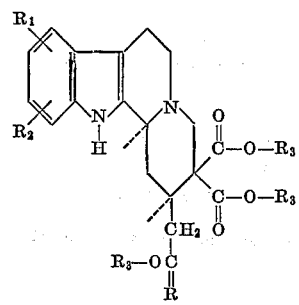

in which:

$R_1$ and $R_2$ are hydrogen, lower alkyl or lower alkoxy or, when taken together, methylenedioxy and $R_3$ is methyl or ethyl.

7. A compound according to claim 6 in which $R_1$ and $R_2$ are hydrogen and $R_3$ is methyl.

References Cited

Van Tamelen and Placeway: J. Am. Chem. Soc., vol. 83, pp. 2594–5 (1961).

HENRY R. JILES, Primary Examiner

G. T. TODD, Assistant Examiner

U.S. Cl. X.R.

260—326.15, 485, 999

UNITED STATES PATENT OFFICE
CERTIFICATE OF CORRECTION

Patent No. 3,480,637          Dated November 25, 1969

Inventor(s) Bryce Douglas and Jerry A. Weisbach

It is certified that error appears in the above-identified patent and that said Letters Patent are hereby corrected as shown below:

Column 1, line 56, the Roman numeral "V" should be deleted.
Columns 1-2, lines 34 to 40, Formula III should appear as follows:

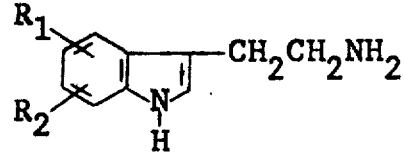

Columns 1-2, lines 44 to 49, in the left-hand formula, that portion of the formula reading [structure] should read [structure].

Column 2, lines 12 to 19, in Formula II, that portion of the formula reading [structure] should read [structure].

Column 2, lines 35 to 37, in Formula IV, the right-hand portion of the formula reading $\left(\overset{O}{\underset{\|}{C}}-O-R_2\right)_2$ should read $\left(\overset{O}{\underset{\|}{C}}-O-R_3\right)_2$.

Column 2, lines 53 to 55, in the right-hand formula, that portion of the formula reading $R_3-O-\overset{|}{\underset{R}{C}}$ should read $R_3-O-\overset{|}{\underset{O}{C}}$.

Column 2, line 56, below the right hand formula, insert -- V --
Column 6, line 18, "bis(carbomethoxy-2" should read -- bis(carbomethoxy)-2 --. Column 6, line 50, "$R_2$ is methyl" should read -- $R_3$ is methyl --. Column 6, lines 68 to 70, that portion of the formula reading $R_3-O\overset{|}{\underset{R}{C}}$ should read $R_3-O-\overset{|}{\underset{O}{C}}$.

SIGNED AND SEALED

JUN 16 1970

(SEAL)
Attest:

Edward M. Fletcher, Jr.
Attesting Officer

WILLIAM E. SCHUYLER,
Commissioner of Patents